K. SULZBERGER.
DYNAMO ELECTRIC MACHINE.
APPLICATION FILED DEC. 12, 1906.
902,020.
Patented Oct. 27, 1908.
2 SHEETS—SHEET 1.
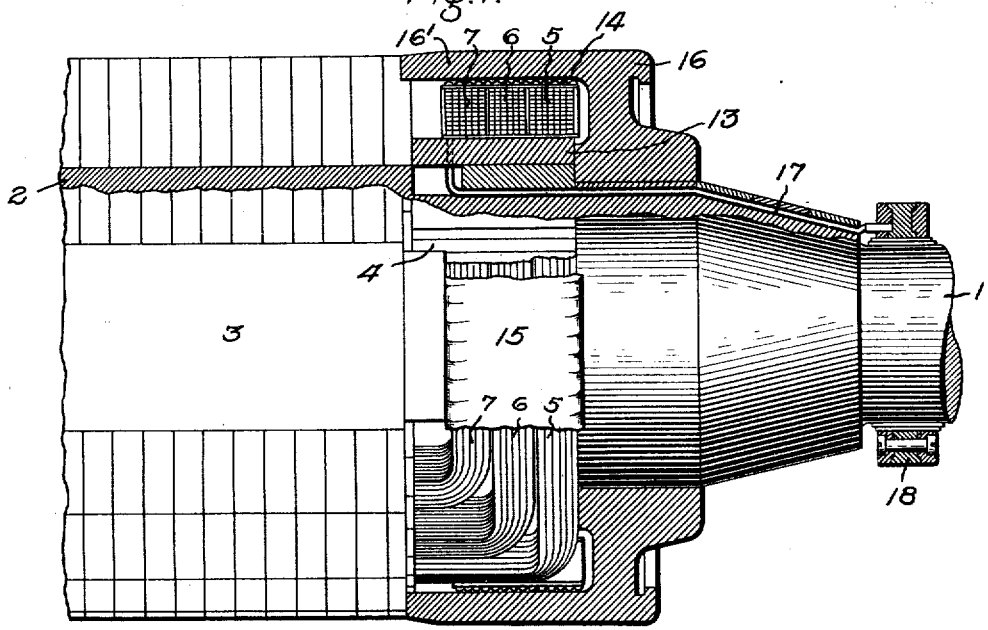
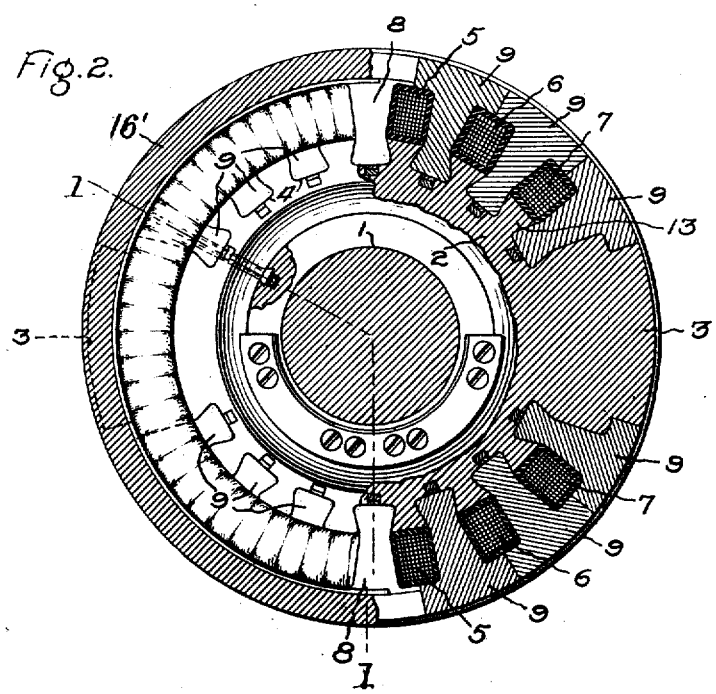
Witnesses:
Margaret E. Hooley
Helen Orford
Inventor:
Karl Sulzberger,
by Albert G. Davis
Atty.

K. SULZBERGER.
DYNAMO ELECTRIC MACHINE.
APPLICATION FILED DEC. 12, 1906.
902,020.
Patented Oct. 27, 1908.
2 SHEETS—SHEET 2.
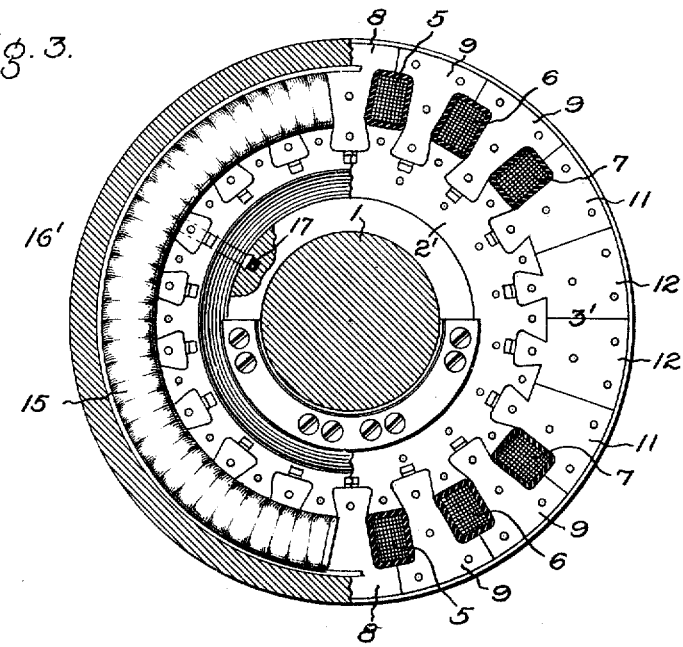
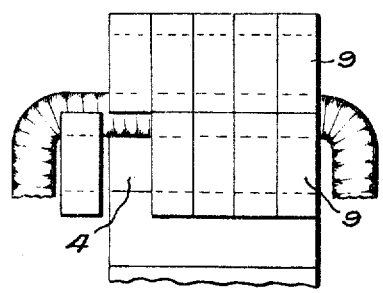
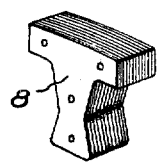
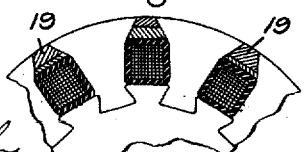
Witnesses:
Margaret E. Hooley
Helen Oxford
Inventor:
Karl Sulzberger,
by Albert G. Davis
Att'y.

UNITED STATES PATENT OFFICE.

KARL SULZBERGER, OF CHARLOTTENBURG, GERMANY, ASSIGNOR TO GENERAL ELECTRIC COMPANY, A CORPORATION OF NEW YORK.

DYNAMO-ELECTRIC MACHINE.

No. 902,020.　　　Specification of Letters Patent.　　　Patented Oct. 27, 1908.

Application filed December 12, 1906. Serial No. 347,463.

*To all whom it may concern:*

Be it known that I, KARL SULZBERGER, a citizen of Switzerland, residing at Charlottenburg, Germany, have invented certain new and useful Improvements in Dynamo-Electric Machines, of which the following is a specification.

My present invention relates to the construction of dynamo-electric machines, and more particularly to the construction of the rotating members of dynamo electric machines.

One object of my invention is the production of a construction in which "formed" coils may be positively but removably secured to the rotating member even when the opposite turns of coils are separated by many degrees of arc.

Another object obtained with my construction in some cases, is the production of a rotating member having distributed windings and definite polar properties. This object of my invention I may obtain, while at the same time I produce a rotating member having a smooth external surface.

The embodiments of my invention which I have hereinafter described and illustrated also possesses many advantageous features of construction, which are pointed out with particularity in the claims annexed to and forming a part of this specification.

For a better understanding of my invention reference may be had to the accompanying description and drawings in which I have illustrated and described embodiments of my invention.

Of the drawings, Figure 1 is an elevation of the rotating member of a dynamo-electric machine embodying my invention with parts broken away and in section on the line 1 1 of Fig. 2; Fig. 2 is an end elevation of the construction shown in Fig. 1 with parts broken away and in section; Fig. 3 is a view similar to Fig. 2 showing a modified construction; Fig. 4 is a partial plan view illustrating the manner in which the coil retaining blocks are secured in place; Fig. 5 is a perspective view of a laminated coil retaining block which may be employed; and Fig. 6 is a partial end elevation illustrating another modification.

In the particular embodiments of my invention which I have shown in the drawings, 1 represents the shaft carrying the rotating two-pole field magnet of a dynamo electric machine. The core 2 proper of the field magnet shown in Figs. 1 and 2, may be regarded as cylindrical in form with two similar diametrically-opposed integral central polar projections 3. In this form of my invention the shaft 1, core body 2, and polar projections 3 are integral. The outer surface of the core between the polar projections has formed in it a series of undercut grooves or slots 4 which extend parallel to the axis of the shaft 1.

The windings for the field magnet comprise two similar sets of conductors, each in the form of three loops or coils 5, 6 and 7, one set surrounding each polar projection. The coils 5, 6 and 7 are secured in place by two diametrically-opposed sets of coil or conductor holders 8 and four similar sets of coil or conductor holders 9. The various coil holders or conductor-securing devices each consist of a short block of the general shape shown in Fig. 5 having a tenon or projection which enters the corresponding undercut groove or slot 4. The holders 8 are located midway between the polar projections 3, and one set of holders 9 is located between each polar projection 3 and each support 8. Each set of holders 9 comprises three rows of blocks,—one row between the corresponding polar projection and the adjacent side of the coil 7; one row between the adjacent sides of the coils 7 and 6; and one row between the adjacent sides of the coils 5 and 6.

In assembling the windings on the core the windings are placed upon the core body with each coil side resting on the appropriate ribs between the ends of the coils 5, 6 and 7 and projecting beyond the end of the core a distance equal to or greater than the thickness of each block 9. The blocks 9 are inserted radially in the space between the end of the core and the inner end of the end connections of the coils and then moved axially into place in the slots 4. This method of assembling is indicated in Fig. 4. The blocks 8 may be secured in place before or after the coils are upon the core body. The blocks 8 and 9 may be locked in the slots 4 in any suitable manner; for instance, in channels formed at the bottoms of the slots 4 in the core body.

Instead of forming the core body of solid material as indicated in Figs. 1 and 2, it may comprise a laminated shell 2' as indicated in Fig. 3, which is secured in any suitable manner directly to the shaft 1 or to a shell or spider member carried by it. In this form of my invention the polar portions 3' corresponding to the polar portions 3 of the construction shown in Figs. 1 and 2, are composed of blocks of laminated material secured to the core body in the same manner as the coil holders 8 and 9. In this form of my invention the core body may be cylindrical with a series of equally spaced undercut slots formed in its outer surface into which the coil holders and blocks forming the central polar portion 3' are received. In Fig. 3 the portion of the core within each inner coil 7 comprises two outer sets of blocks 11 each having its side adjacent the conductors shaped like the sides of the coil holders 8 and 9, and its opposite sides radial, and two inner sets of blocks 12 having radial sides.

In all forms of my invention the coil holders 8 and 9 may be formed of laminæ riveted together as indicated in Fig. 5. The coil holders 8 and 9 shown in Figs. 1-5 inclusive, are so shaped that when inserted in place the core and coil holders form a cylindrical body pierced by a number of longitudinally extending coil receiving passages which are parallel to the axis of the shaft 2, and are substantially rectangular in shape.

The core body and the polar projections are of course formed of magnetic material and the coil holders 8 and 9 may also be formed of magnetic material, although in some cases part of the coil holders may be made of magnetic material, while others are made of non-magnetic material. An advantageous arrangement consists in forming the coil holders 8 of non-magnetic material such as phosphor bronze, and all of the coil holders 9 of magnetic material. This arrangement insures that the field magnet shall have sharply defined polar properties.

In the construction shown in Fig. 1, the end portions of the windings rest on a cylindrical supporting surface 13 concentric with and carried by the shaft 1. The ends of the windings may be firmly secured against the support by a layer of wire 14. If desired, blocks or wedges may be inserted in the spaces in the bends of the coils or parts of the distributed windings and between the ends of the polar projections and the windings. It will of course be understood that the conductors are surrounded by suitable insulating material. Each set of coils may be taped together as shown at 15 in Fig. 1. A collar member 16 carried by the extension or support which may be shrunk in place, is provided with a flange portion 16' which extends over the ends of the windings to the ends of the core body 2. The flange 16' serves as a protecting shield or cover for the ends of the windings. Suitable connections 17 are established between the windings and collector rings 18 mounted on the shaft.

Instead of having the spaces formed between adjacent coil supports and the core body of the exact shape of the windings as in the construction shown in Figs. 1 to 4 inclusive, the passages may be made larger and of different shape than the windings, as shown in Fig. 6, in which case, wedges 19 are driven into the spaces above the conductors to lock the whole firmly together.

Features of my invention shown and described but not claimed herein are claimed in my prior application Serial No. 254,461, filed April 8, 1905. It will be obvious to all those skilled in the art that certain features of my invention may be used without a corresponding use of others. Those skilled in the art will also recognize that changes may be made in the form of my invention without departing from its spirit, and I do not wish the claims hereinafter made to be limited to the particular construction shown more than is made necessary by the state of the art.

What I claim as new and desire to secure by Letters Patent of the United States, is,—

1. In combination, a core having an axially extending undercut slot or groove formed in its surface, conductors formed into a loop or coil applied thereto and proportioned so that a space extends between one end of said slot and the inner surface of one end of said loop or coil, and a conductor holder having a tenon fitted to said slot, radially inserted into said space and then moved axially into said slot.

2. In a dynamo electric machine, a substantially cylindrical core body, a formed coil applied thereto and proportioned so that a space extends between one end of the core body and the inner surface of one end of said coil, and coil holders secured to said body by tongue and slot connections, said coil holders being formed in sections or units which are passed one at a time radially into said space between the end of the coil and the end of the core body and are then moved axially to bring about the tongue and slot engagement between the unit and the body.

3. In combination, a core, a winding therefor, holders or securing devices for the winding dovetailed to the core and end connections for the winding spaced away from the end of said core, said holders being made in the form of short blocks or units to first allow of their insertion radially into the space between the end connections and the end of the core and their subsequent axial movement to bring about the dove-tailed connection between the blocks and the core.

4. In combination, a rotating core body provided with a number of parallel ribs, adjacent ribs being separated by undercut grooves, conductors resting on said ribs, and a plurality of short blocks entering each groove, each block having a tenon entering the groove, and portions overhanging the conductors resting on the ribs at opposite sides of the grooves, the outer ends of different blocks being equi-distant from the axis of rotation, and end connections for the conductors spaced away from the end of the core body, whereby the blocks may be inserted one at a time into the end of the proper groove.

5. In combination, a core body provided with a number of parallel ribs, adjacent ribs being separated by undercut grooves, conductors resting on said ribs, and a plurality of blocks entering each groove, each block having a tenon engaging the ribs at opposite sides of the groove and portions overhanging the conductors resting on adjacent ribs, and end connections for the windings spaced away from the end of the core body a distance not less than the axial length of a block whereby the blocks may be inserted one at a time into the end of the proper groove.

6. In combination, a core body provided with a number of axially extending ribs, the sides of which are undercut, a coil part resting on each rib, retaining devices therefor each having a tenon portion engaging adjacent sides of adjacent ribs, a portion separating the coil parts resting on said adjacent ribs, and other portions overhanging the coil parts resting on said ribs, and a locking device engaging the coil part resting on each rib and the retaining devices at opposite sides thereof.

7. In a dynamo electric machine, a rotating member comprising a core having a plurality of central polar portions, a portion at each side of each polar portion provided with a number of axially extending ribs, adjacent ribs being separated by undercut grooves, a distributed winding surrounding each of said polar portions and comprising parts resting one on top of each of said ribs, and a plurality of blocks entering each groove, each block having a tenon engaging the adjacent ribs and portions overhanging the conductors resting thereon, and end connections for the windings spaced away from the end of the core, whereby the blocks may be inserted one at a time into the end of the proper groove.

8. In a dynamo electric machine, a rotating member comprising a core having a plurality of central polar portions, a portion at each side of each polar portion provided with a number of axially extending ribs, adjacent ribs being separated by undercut grooves, a distributed winding surrounding each of said polar portions and comprising parts resting one on top of each of said ribs, a plurality of blocks entering each groove, each block having a tenon engaging the adjacent ribs and portions overhanging the conductors resting thereon, the outer ends of said blocks and of said polar portions being equidistant from the axis of rotation, and end connections for the windings spaced away from the end of the core, whereby the blocks may be inserted one at a time into the end of the proper groove.

9. In a dynamo electric machine, a rotating member comprising a core having a plurality of central polar portions, a portion at each side of each polar portion provided with a number of axially extending ribs, adjacent ribs being separated by undercut grooves, a distributed winding surrounding each of said polar portions and comprising parts resting one on top of each of said ribs, and a plurality of blocks entering each groove, each block having a tenon engaging the adjacent ribs and portions overhanging the conductors resting thereon, said blocks being passed radially between the end of the core body and the end connections of the winding into position to enter the ends of the proper slots.

10. In combination, a core body provided with a number of parallel ribs the sides of which are undercut, a coil part resting on each rib, retaining devices for the coil parts, each having a tenon portion engaging the adjacent sides of adjacent ribs, a portion separating the coil parts resting on said adjacent ribs, and other portions overhanging the coil parts resting on said adjacent ribs, and wedge locking means engaging the outer surface of each coil part and the retaining devices at opposite sides thereof.

11. In combination, a core comprising a body portion partly cylindrical, the cylindrical portion being provided with a plurality of ribs separated by undercut grooves, conductor parts resting on the tops of the ribs, a plurality of coil retaining devices for each groove, each device having a tenon which enters the corresponding groove and portions which overhang the conductors resting on the ribs at the side of the grooves, and end connections for the conductor parts spaced away from the end of the core, whereby the said coil retaining devices may be inserted one at a time into the end of the proper groove.

12. In combination, a core body provided with a number of axially extending ribs and under cut grooves, a coil part resting on each rib, retaining devices for the coil parts, each having a tenon portion engaging the under cut groove, a portion separating the coil parts resting on said adjacent ribs and other portions overhanging and engaging the outer surface of the coil parts resting on said adjacent ribs and retaining said coil parts in position, and end connections for the coil parts spaced away from the core body, whereby the retaining devices for the core parts may be inserted into the end of the proper groove.

13. In combination, a core body provided with a number of axially extending ribs and under cut grooves, a coil part resting on each rib, retaining evices for the coil parts, each consisting of a plurality of blocks having tenons entering the under cut grooves, and end connections for the windings spaced away from the end of the core body, whereby the blocks may be inserted one at a time into the end of the proper groove.

In witness whereof, I have hereunto set my hand this 17th day of November, 1906.

KARL SULZBERGER.

Witnesses:
  MAX HAMBURGER,
  JULIUS RUMLAUS.